(12) United States Patent
Warner et al.

(10) Patent No.: US 6,904,861 B1
(45) Date of Patent: Jun. 14, 2005

(54) BOAT CAPTURE SYSTEM

(75) Inventors: James D. Warner, San Diego, CA (US); Thomas A. Knoebel, San Diego, CA (US); Jospeh R. Deuth, Alpine, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/807,639

(22) Filed: Mar. 24, 2004

(51) Int. Cl.$^7$ ................................................. B60P 3/10
(52) U.S. Cl. ................................... 114/344; 280/414.1
(58) Field of Search ...................... 114/242, 253, 343, 114/344; 280/414.1, 414.2, 414.3

(56) References Cited

U.S. PATENT DOCUMENTS

| | | | |
|---|---|---|---|
| 3,540,610 A | * | 11/1970 | Pontani .................... 280/414.3 |
| 3,632,138 A | * | 1/1972 | Whiteley, Jr. ............. 280/414.1 |
| 4,895,387 A | * | 1/1990 | Hawkins et al. .......... 280/414.1 |
| 4,995,629 A | * | 2/1991 | Poppell .................... 280/414.1 |
| 5,380,143 A | * | 1/1995 | Mohan ........................ 114/344 |

OTHER PUBLICATIONS

"Key dolphin launch and recovery system developed", Out-Look, Jan. 22, 1999, p. 1, SPAWAR Systems Center, San Diego, CA USA.

* cited by examiner

*Primary Examiner*—S. Joseph Morano
*Assistant Examiner*—Lars A. Olson
(74) *Attorney, Agent, or Firm*—Peter A. Lipovsky; Michael A. Kagan; Allan Y. Lee

(57) ABSTRACT

A system for docking a boat under substantial power in calm or rough seas includes a modified trailer platform having goalposts that guide the boat onto the platform. An elastic harness is attached to either side of the trailer platform and is positioned to interface the V-shaped bow of the vessel. A latch on the bow snags the harness as the vessel is being docked. The latch has a spring-biased and weighted cam that moves to an open position upon the harness contacting the cam and that then rotates to a closed position once the harness passes the cam. The harness then enters a hook formed by the latch and the closed position of the cam retains the harness in the hook. The expandable and retractable harness dissipates the kinetic energy of the docking vessel and assists in bringing the vessel to a rest.

9 Claims, 3 Drawing Sheets

BOAT CAPTURE SYSTEM

BACKGROUND

The ensuing description relates generally to boat docking systems. In a prior art system, it is known to employ a rigid "U" shaped attachment to a boat trailer in conjunction with a small latch on the forward portion of the "V" shaped bow of a boat. This system works to lock the boat on the trailer but lacks the capability of catching and arresting a boat that undergoes a large, constantly changing, vertical height component caused by surging seas. The rigid, bent metal tube, construction of the trailer attachment lacks a method of absorbing the high amounts of kinetic energy needed to quickly capture and arrest a heavy marine vessel coming into a trailer from the open sea. In such circumstances, destruction of the prior art system is likely as well as damage to the boat and harm to its occupants.

SUMMARY

A system of docking a small boat (a marine vessel) allows the boat to be driven onto a trailer platform under substantial power and in many sea conditions. The trailer is equipped with one or more pairs of goalposts that interface with the gunwales of the boat to assist in positioning the boat upon the platform. To absorb the kinetic energy of the moving vessel, an expandible and retractable harness is attached to either side of the trailer platform so that a length of the harness crosses the path of the vessel. Elastic cords positioned the harness at a height that interfaces with the V-shaped bow of the vessel as it is being docked. A latch, attached to the bow of the vessel, snags the harness as it lies across the path of the docking boat. The latch has a spring-biased and weighted cam that first moves to an open position upon the harness contacting the cam. The latch rotates to a closed position once the harness passes the cam. The harness then enters into a hook formed by the latch and the closed position of the cam retains the harness in the hook. The expandable and retractable harness dissipates the kinetic energy of the vessel as it is being docked and assists in bringing the vessel to a rest. This technique of docking has use in calm as well as extremely rough seas.

Other objects, advantages and new features will become apparent from the following detailed description when considered in conjunction with the accompanied drawings.

DESCRIPTION

Figure 1:
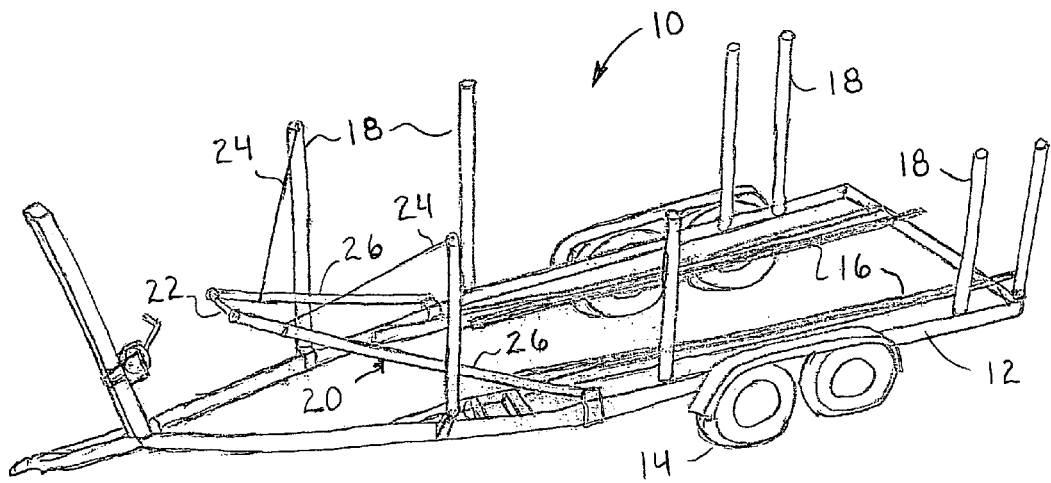
FIG. 1 illustrates a representative docking system according to the description herein.

Referring to FIG. 1, a representative marine vessel docking system 10 is shown. Docking system 10 can be used in tranquil as well as high sea states, such as sea states of 2 and 3. In either calm or rough sea state usage, an operator of a marine vessel can choose to approach docking system 10 under considerable power. By using such power in high sea conditions, the vessel's captain has greater steering and maneuverability control in docking the boat, thereby assisting the captain in overcoming the tumultuous ocean and wind forces that can tear at the boat and make docking difficult and dangerous to both the vessel and its operator. While the docking system has use at land-based boat launching facilities, it can also be used onboard "tailgate" vessels such as on the roll-on, roll-off sterngate of a landing craft utility (LCU) vessel wherein the tailgate is lowered at-sea.

Referring once again to FIG. 1, it can be seen that system 10 can use a commercially available trailer platform 12 modified according to the further description provided herein. Though platform 12 is shown equipped with wheels 14, one can envision scenarios where such wheels are removed, for example, the use of the platform on certain floating docks and the like, on which the trailer platform is rigidly fixed.

As with traditional trailer design, platform 12 is equipped with support surfaces, such as skids 16, that are designed to contact the vessel hull to bear the weight of a marine vessel that is docking and that is docked upon the trailer. Of course, rollers are also possible for such purposes and even a combination of rollers and skids can be used.

In accordance with the docking system described herein, oppositely disposed "goalposts" 18 are attached to the frame of the trailer platform. These flexible goalposts are placed on opposite sides of the platform and are designed to interface with the gunwales of a boat to assist in positioning the boat upon the trailer platform during the docking of the boat. As can be seen, the goalposts may be positioned to contact the forward, midship and aft locations of the gunwales once the boat is fully docked. These goalposts may be covered with poly-vinyl-chloride (PVC) tubing.

In further accordance with the description herein, an elastic U-shaped harness 20 is attached on opposite sides of platform 12 so that the harness crosses the path of a marine vessel as it is being docked upon platform 12. More specifically, a length 22 is suspended at a height designed to interface with a V-shaped bow of a vessel being docked. In this embodiment, harness 20 is hoisted by elastic cords 24, for example bungee cords, that are slung between the forward goalposts 18 and the harness. To enhance a U-shaping of the harness, the harness can be threaded through two sections of stiff hose 26 that are placed oppositely on the harness. These sections of stiff hose serve to shape the harness as well as assist in propelling the harness downwardly upon contact with a docking vessel.

Figure 2:
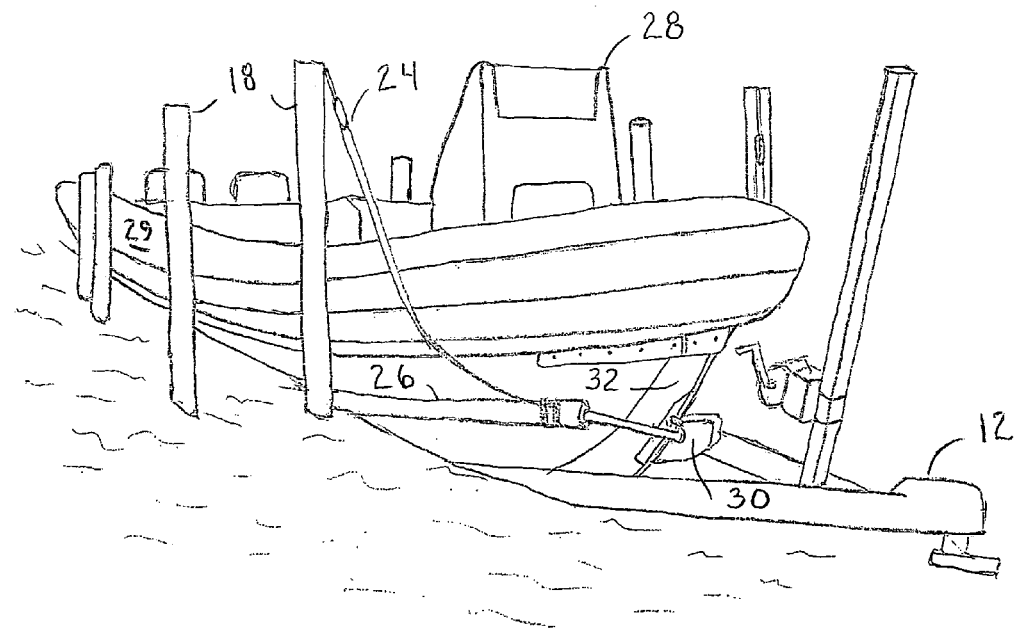
FIG. 2 depicts a marine vessel utilizing the docking system described herein.

Referring now to FIG. 2, a marine vessel 28 is shown in a docked position on trailer platform 12. Marine vessel 28 can be any of a variety of V-shaped bowed vessels, such as of tri-hull, single V hull and V-bow rigid hulled inflatable boats, for example, such as that shown in FIG. 2. As can be seen, goalposts 18 closely conform to gunwales 29 of vessel 28 in this figure.

Further shown in FIG. 2 is a latch 30 attached to V-shaped bow 32 of vessel 28. Referring to both FIGS. 1 and 2, as vessel 28 moves onto trailer platform 12, harness 20 slides down V-shaped bow 32 into latch 30. The elasticity of the harness absorbs the moving or kinetic energy of vessel 28 while the latch retains the harness and assists in securing the vessel on platform 12.

Figure 3:
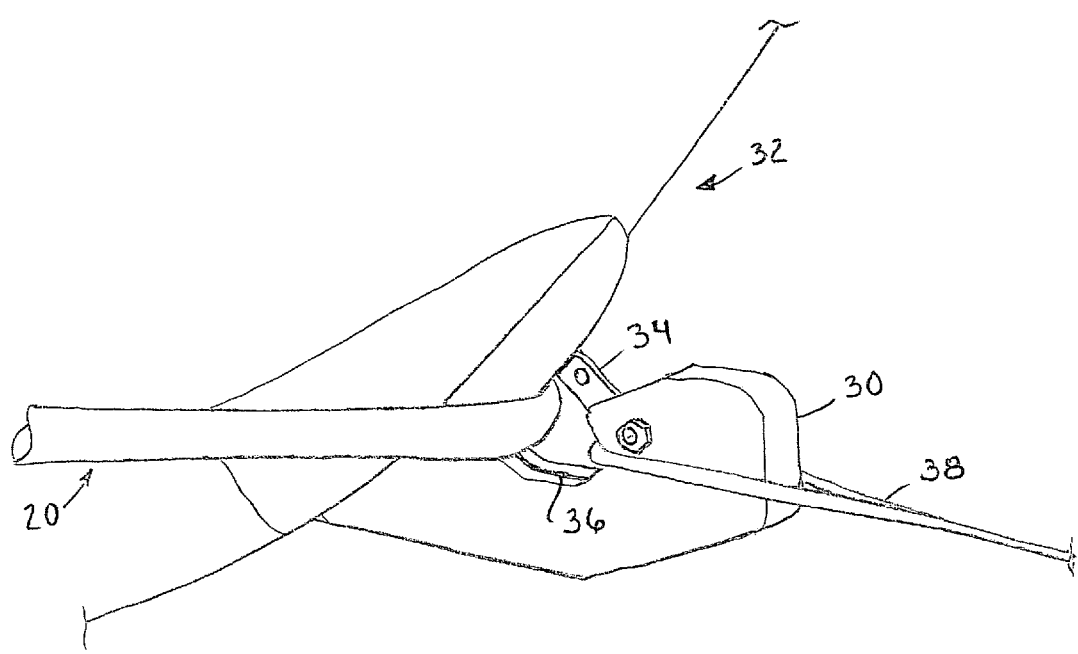
FIG. 3 shows a close-up view of a latch as may be used in the docking system described further herein.

In FIG. 3, a close-up view of latch 30 is shown. In this figure, latch 30 is shown with a cam 34 in a closed position. Cam 34 resides in a recess 36 defined in the body of latch 30. A lanyard 38, as strung from a winch of trailer platform 12, may be used to further secure vessel 28 once the vessel is docked on the platform. Harness 20 allows the operator of the vessel to maintain power while lanyard 38 or other lashings are made, thereby facilitating a safe and secure docking of the vessel.

Figure 4A:
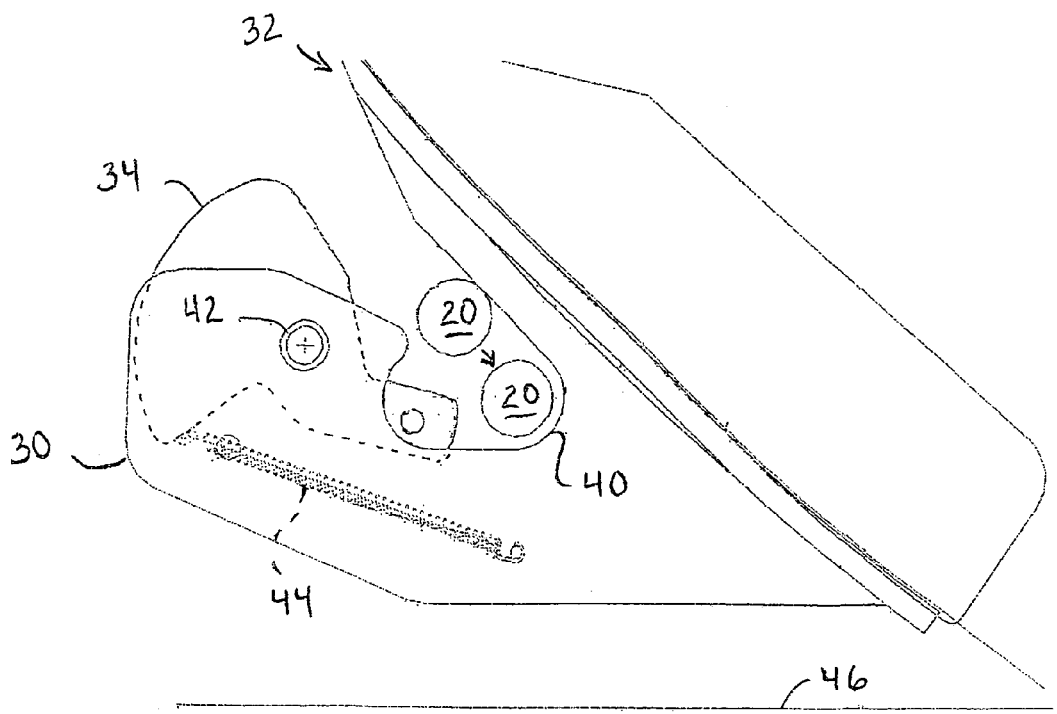
FIG. 4A shows the latch of FIG. 3 in an open position.
Figure 4B:
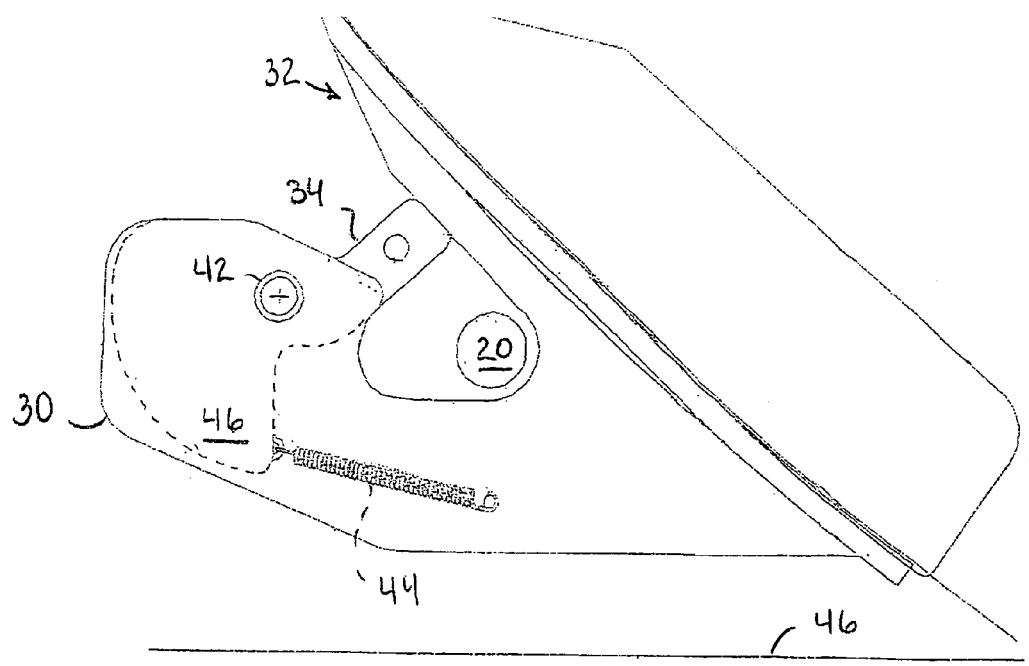
FIG. 4B is another view of the latch of FIG. 3 in which the latch is shown in a closed position.

In FIGS. 4A and 4B, there are shown respective views of latch 30 in open and closed positions. In FIG. 4A, cam 34 has been moved to the open position by harness 20 passing down V-shaped bow 32 into hook 40 defined in the latch. To achieve this position, cam 34 rotates about pivot 42 as harness 20 interfaces with the cam. Such rotation of cam 34 causes spring bias 44 to elongate. FIGS. 4A and B show an approximate water level 46 as it relates to latch 30.

In FIG. 4B, a closed position of latch 30 and its cam 34 are illustrated. As can be seen in this figure, cam 34 is biased to the closed position by spring bias 44 taking a retracted position. Cam 34 also has a weighted lobe 46 that further assists in biasing cam 34 to the closed position.

In the case of a 25 foot rigid hulled inflatable boat weighing approximately 10,000 pounds, a 1.5 inch diameter nylon harness sufficiently decelerated the vessel from a closing speed of 4.5 knots. The 2.5 g deceleration was accomplished in approximately one foot of horizontal displacement.

Obviously, many modifications and variations are possible in light of the above description. It is therefore to be understood that within the scope of the claims the invention may be practiced otherwise than as has been specifically described.

What is claimed is:

1. A docking system for a V-shaped-bow marine vessel comprising:
   a trailer platform having a plurality of support surfaces that interface with the hull of said vessel upon said vessel being docked upon said trailer platform;
   oppositely disposed goalposts attached to said trailer platform wherein said goalposts interface with the gunwales of said vessel to thereby guide said vessel on said trailer platform upon said vessel being docked;
   an elastic U-shaped harness attached to opposite sides of said trailer platform and positioned to provide a length of said harness that traverses a path of said vessel upon said vessel being docked upon said trailer platform, said length of said harness being suspended to a height that interfaces the bow of said vessel by stretchable cords strung from said goalposts to said harness; and
   a latch attached to said bow, wherein said latch is disposed to snag said harness at a location along said length of said harness wherein said harness substantially elastically elongates and retracts to absorb the kinetic energy of said vessel and arrests motion of said vessel upon said vessel being docked upon said trailer platform, said latch defining a hook and having a spring-biased, weighted, rotatable cam that moves to an open position upon said harness contacting said cam while moving towards said hook and that snaps to a closed, latched, position upon said harness moving past said cam and entering said hook.

2. The system of claim 1 wherein said support surfaces are skids.

3. The system of claim 1 wherein said goalposts are covered with poly-vinyl-chloride tubing.

4. The system of claim 3 wherein said goalposts are positioned on said trailer platform to contact said gunwales at forward, midships and aft locations of said marine vessel.

5. The system of claim 1 wherein said harness is a nylon rope.

6. The system of claim 1 wherein said harness is threaded through two sections of hose that are placed oppositely over the harness.

7. A docking system for a V-shaped-bow marine vessel comprising:
   a trailer platform having a plurality of skid support surfaces that interface with the hull of said vessel upon said vessel being docked upon said trailer platform;
   oppositely disposed poly-vinyl-chloride covered goalposts attached to said trailer platform wherein said goalposts interface with the gunwales of said vessel to thereby guide said vessel on said trailer platform upon said vessel being docked;
   an elastic U-shaped nylon harness attached to opposite sides of said trailer platform and positioned to provide a length of said harness that traverses a path of said vessel upon said vessel being docked upon said trailer platform, said length of said harness being suspended to a height that interfaces the bow of said vessel by stretchable cords strung from said goalposts to said harness; and
   a latch attached to said bow, wherein said latch is disposed to snag said harness at a location along said length of said harness wherein said harness substantially elastically elongates and retracts to absorb the kinetic energy of said vessel and arrests motion of said vessel upon said vessel being docked upon said trailer platform, said latch defining a hook and having a spring-biased, weighted, rotatable cam that moves to an open position upon said harness contacting said cam while moving towards said hook and that snaps to a closed, latched, position upon said harness moving past said cam and entering said hook.

8. The system of claim 7 wherein said goalposts are positioned on said trailer platform to contact said gunwales at forward, midships and aft locations of said marine vessel.

9. The system of claim 7 wherein said harness is threaded through two sections of hose that are placed oppositely over the harness.

* * * * *